United States Patent
Muramatsu

[11] Patent Number: 5,933,576
[45] Date of Patent: Aug. 3, 1999

[54] PRINTING ASSEMBLY AND PRINTING METHOD FOR CONTEMPORANEOUS PRINT JOBS

[75] Inventor: Kiyoji Muramatsu, Nagoya, Japan

[73] Assignee: Brother Kogyo Kabushiki Kaisha, Nagoya, Japan

[21] Appl. No.: 08/724,217

[22] Filed: Oct. 1, 1996

[30] Foreign Application Priority Data

Oct. 20, 1995 [JP] Japan .................................. 7-272554

[51] Int. Cl.⁶ ........................................................ B41B 15/00
[52] U.S. Cl. ........................ 395/101; 395/101; 395/102; 395/103; 395/104; 395/112; 395/113
[58] Field of Search .................................. 358/400, 462; 395/103, 110, 112, 113, 101, 102, 104

[56] References Cited

U.S. PATENT DOCUMENTS

5,422,729  6/1995  Yoshida .................................. 358/400

Primary Examiner—Edward L. Coles
Assistant Examiner—Twyler Lamb
Attorney, Agent, or Firm—Oliff & Berridge, PLC

[57] ABSTRACT

A printer receives input data from an external apparatus and converts the received input data into print data. The print data is provided to a printing device for carrying out printing operations on the basis of the print data. A data transmitting device transmits the print data, converted from the received input data, to another printer.

17 Claims, 13 Drawing Sheets

PRINTING ASSEMBLY AND PRINTING METHOD FOR CONTEMPORANEOUS PRINT JOBS

BACKGROUND OF THE INVENTION

1. Field of the Invention

The present invention relates to a printer and a printing method and, more particularly, to a printer and a printing method for outputting at least a portion of data received for printing to another external printer.

2. Description of Related Art

In a conventional printer, a print control unit receives input data, produces print data on the basis of the input data, and gives the print data to a print unit. In a copy printing mode, when producing a plurality of printed sheets carrying the same print data by such a printer, the desired number of printed sheets is specified for the printer and the printer prints the print data on one print sheet at a time. In a division printing mode, when the printer receives a print instruction to print the print data on a printing sheet of a sheet size exceeding a possible sheet size limited by the construction of the printer, the print data is divided into a plurality of pieces of data. Then, the plurality of pieces of data are printed on a plurality of printing sheets individually, and the plurality of printed sheets are connected or patched together to obtain a printed sheet of a desired large size. Since the printer needs to print the print data on the plurality of printing sheets in either printing mode, the printer needs additional time to print the print data on a large number of printing sheets. Particularly, when printing posters or the like by a large color plotter or a large color printer, printing on each poster requires much time and reduces productivity remarkably.

A printing method has been proposed to print the print data on a plurality of printing sheets in a relatively short time by using a network of a plurality of printers that operate simultaneously. When carrying out this printing method, a print controller creates a print schedule to assign pages to the plurality of printers and sends corresponding print data to the plurality of printers to operate the plurality of printers simultaneously in a parallel mode for printing.

This previously proposed printing method, however, needs a special print data assigning mechanism to create the print schedule before starting the printing operation. Therefore, input data must first be given to a print control unit provided with the print data assigning mechanism, which is an obstacle to constructing a flexible printing system. Further, since this printing method needs a plurality of printers, an expensive network must be constructed, which is very costly.

SUMMARY OF THE INVENTION

The present invention has been made in view of such problems, and it is therefore one of the objects of the present invention to print the print data on a plurality of printing sheets in a short time. Another object of the present invention is to provide a printer and a printing method capable of constructing a flexible system with low costs and capable of printing data on a plurality of printing sheets in a parallel mode.

With at least the foregoing objects in view, according to a first aspect of the present invention, a printer comprises a data receiving device for receiving input data from an external apparatus, a first data converting device for converting the received input data into print data, a printing device for carrying out a printing operation on the basis of the print data provided by the first data converting device, and a data transmitting device for transmitting the print data provided by the first data converting device to another printer.

According to a second aspect of the present invention, a printer comprises a data receiving device for receiving input data from an external apparatus, a first data converting device for converting the received input data into print data, a data quantity comparing device for comparing the data quantity of the print data with a predetermined data quantity, a data dividing device for dividing the print data into first print data of a data quantity corresponding to the predetermined data quantity and second print data corresponding to a portion of the print data other than the first print data when the data quantity of the print data is greater than the predetermined data quantity, a printing device for carrying out a printing operation on the basis of the first print data, and a data transmitting device for transmitting the second print data to another printer.

Preferably, the printer according to the first or the second aspect of the present invention further comprises a second data converting device for converting the print data into that of a data format that is interpretable by the other printer, and the data transmitting device transmits the print data provided by the second data converting device to the other printer. Thereby, the print data is converted by the second data converting device into that of the data format interpretable by the other printer, and the converted print data is transmitted to the other printer by the data transmitting device.

According to a third aspect of the present invention, a printing method comprises steps of receiving input data from an external apparatus, converting the received input data into print data, carrying out a printing operation on the basis of the converted print data, and transmitting the converted print data to another printer.

According to a fourth aspect of the present invention, a printing method comprises steps of receiving input data from an external apparatus, converting the received input data into print data, comparing the data quantity of the converted print data with a predetermined data quantity, dividing the print data into first print data of a data quantity corresponding to the predetermined data quantity and second print data corresponding to a portion of the print data other than the first print data when the data quantity of the print data is greater than the predetermined data quantity, carrying out a printing operation on the basis of the first print data, and transmitting the second print data to another printer.

In the printing method according to the third or the fourth aspect of the present invention, the print data is converted into that of a data format interpretable by the other printer, and the converted print data is transmitted to the other printer.

As is apparent from the foregoing description, in the printer in accordance with the present invention, the printing device carries out printing on the basis of the converted print data, the converted print data is transmitted to the other printer by the data transmitting device, and the other printer carries out the same printing operation. Thus, a plurality of printed sheets can be produced in the same time required for producing one of the plurality of printed sheets by using a printing system constructed by connecting together a plurality of printers in accordance with the present invention.

The data dividing device divides the print data into the first print data of a data quantity that can be printed by the printing device and the second print data of a data quantity corresponding to that of the rest of the print data. The data transmitting device feeds the second print data to the other printer. Accordingly, a plurality of small printed sheets that are to be put together to form a large printed sheet can be printed in a time equal to a time determined by dividing a time necessary for producing the plurality of small printed sheets by one printer by the number of the printers connected together for a simultaneous printing operation. Such a printing mode can be achieved without requiring any special print data assigning device, and a very flexible printing system can be constructed at low cost.

BRIEF DESCRIPTION OF THE DRAWINGS

Preferred embodiments of the present invention will be described in detail with reference to the following figures, wherein.

DETAILED DESCRIPTION OF PREFERRED EMBODIMENTS

Figure 1:
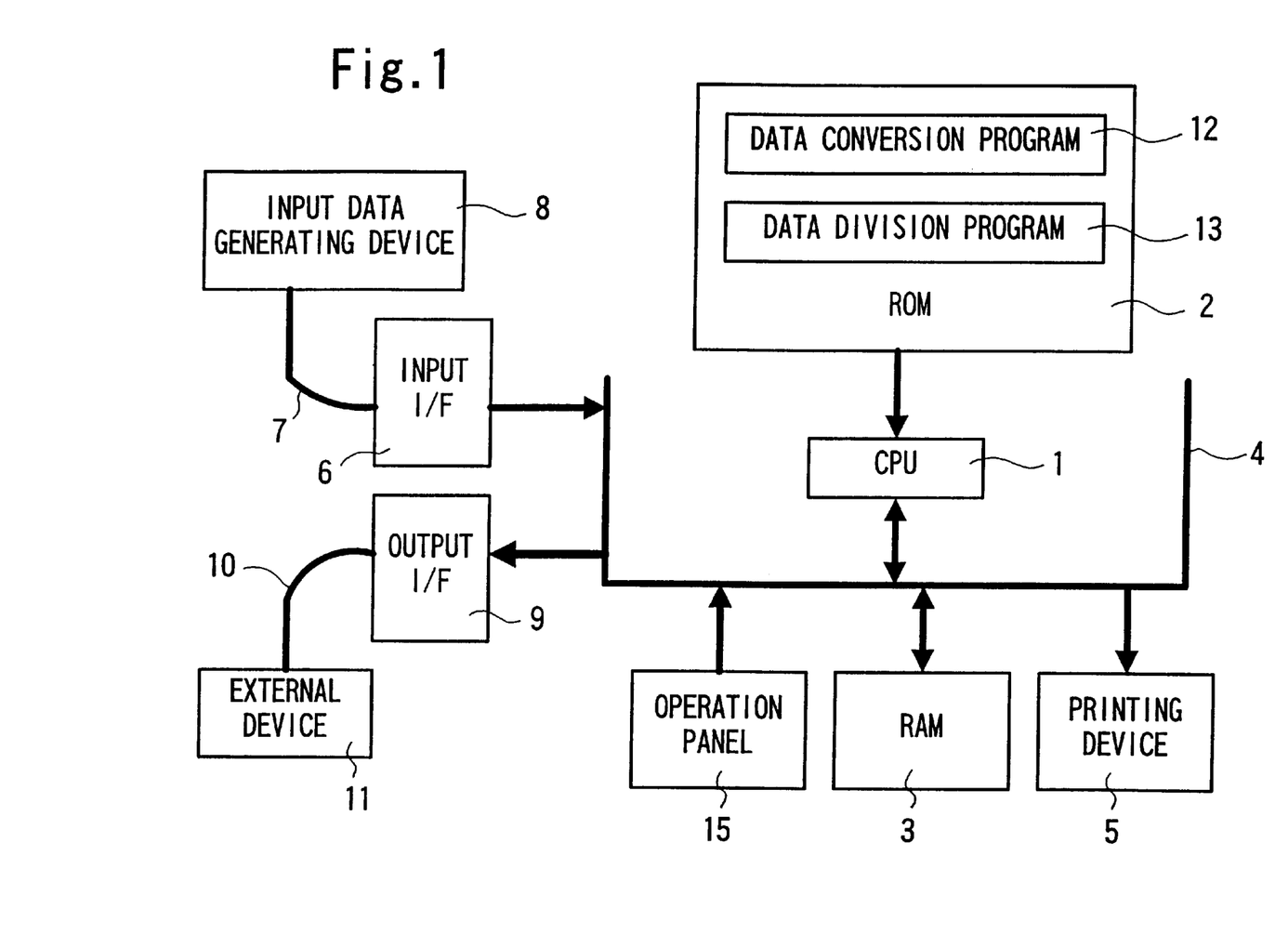
FIG. 1 is a block diagram of a printer in a preferred embodiment according to the present invention.

Referring to FIG. 1 showing a printer in a preferred embodiment according to the present invention in a block diagram, the printer comprises: an input interface 6, connected to an input data generating apparatus 8 by an input connector 7, which could be a cable or other known data connector such as a radio transmitter; a RAM (random access memory) 3 serving as a temporary storage for storing input data 40, a work area necessary for operations to interpret the input data 40 and to convert the same into print data 41 and a storage for storing the print data 41; a CPU (central processing unit) 1 that carries out operations to interpret and execute various instructions; a ROM (read-only memory) 2 storing a data conversion program 12 and a data division program 13; a printing device 5 that carries out printing operations on the basis of the print data 41 stored in the RAM 3; and an output interface 9 connected to an external apparatus 11 to transmit part of or all the print data 41 to the external apparatus 11.

In operation, the input interface 6 receives the input data 40 through the input connector 7 from the input data generating apparatus 8. The input data generating apparatus 8 is, for instance, a computer that generates the input data 40. The input data generating apparatus 8 may also be another printer in accordance with the present invention. The input data 40 received by the input interface 6 is transferred through a bus 4 to the RAM 3 and stored therein. Programs of procedures specified by instructions provided to the CPU 1 are stored beforehand in the ROM 2. In this embodiment, the data conversion program 12 for converting the input data 40 into the print data 41 and the data division program 13 for dividing the print data 41 are stored beforehand in the ROM 2 The programs will be described in detail later. The CPU 1 reads the programs 12 and 13 from the ROM 2 as needed, processes the input data 40 stored in a predetermined storage area in the RAM 3 according to the programs 12 and 13 read from the ROM 2, and stores the print data 41 obtained by processing the input data 40 in a print data storage area in the RAM 3. The printing device 5 reads the print data 41 from the RAM 3 and executes printing operations. The output interface 9 feeds part of or all the print data 41 stored in the RAM 3 through an output connector 10 to the external apparatus 11. The external apparatus 11 can be, similarly to the input data generating apparatus 8, for example, another printer according to the present invention.

The printer in this embodiment is capable of operating in a copy printing mode and a division printing mode, which will be described later. The operator selects either the copy printing mode or the division printing mode by operating an input operation panel 15, which can be any known input device such as a keyboard. When the input data generating apparatus 8 is a computer, the printing mode may be selected by an instruction provided by the computer.

Figure 2:
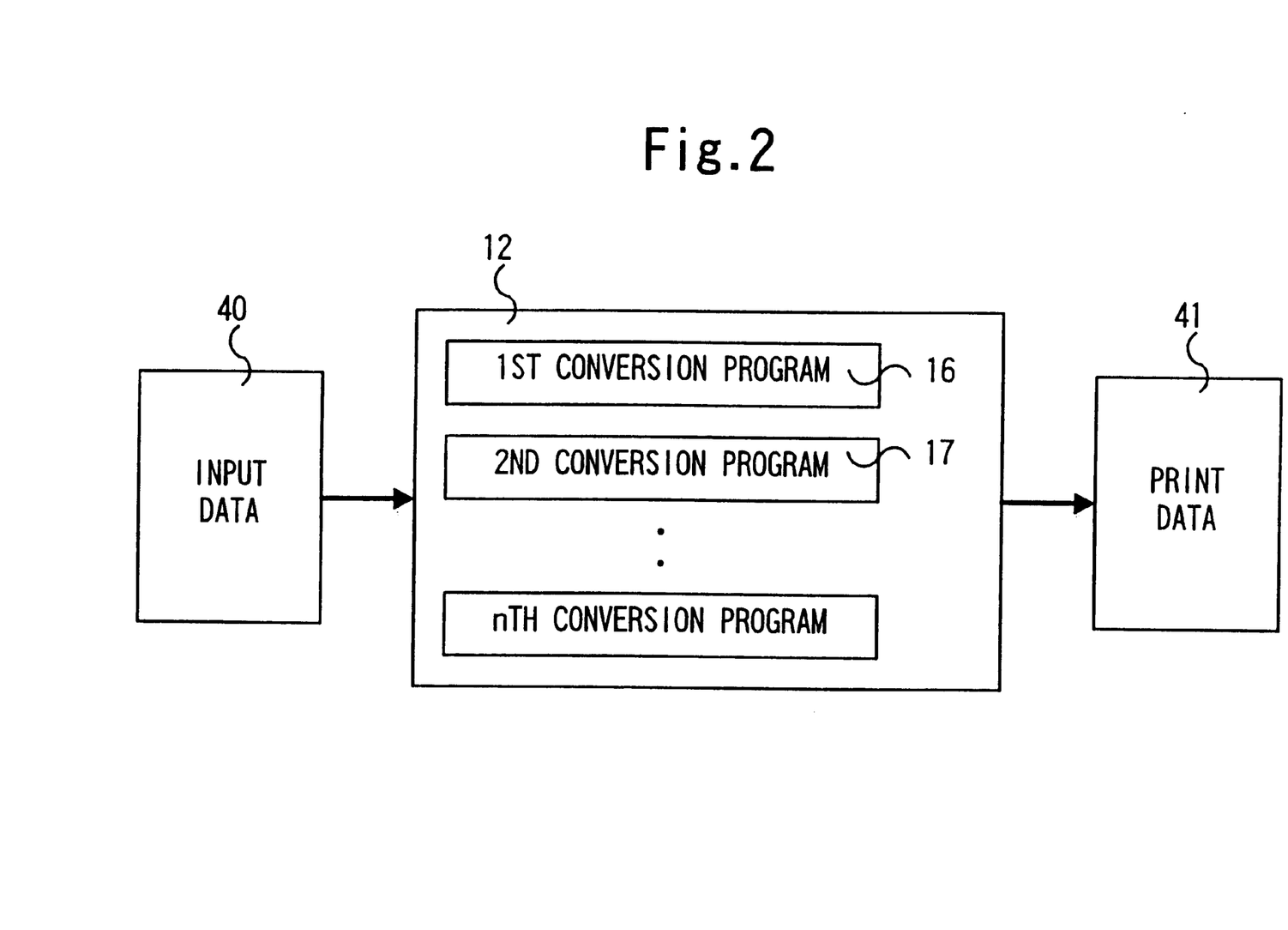
FIG. 2 is a block diagram explaining a data converting procedure.

The data conversion program 12 for converting the input data 40 into the print data 41 will be described in detail with reference to FIG. 2. The data conversion program 12 has a plurality of conversion procedures, which are used selectively according to the data format of the input data 40. In this embodiment, the data conversion program 12 is at least two conversion programs, i.e., a first conversion program 16 for interpreting the input data 40 provided by a host computer serving as the input data generating apparatus 8, and a second conversion program 17 for handling the input data 40 as the print data 41 when the received input data 40 is part of the print data 41. The printer may be provided with a single conversion program depending on the data format of the input data 40 or, in some cases, may be omitted.

Figure 3A:
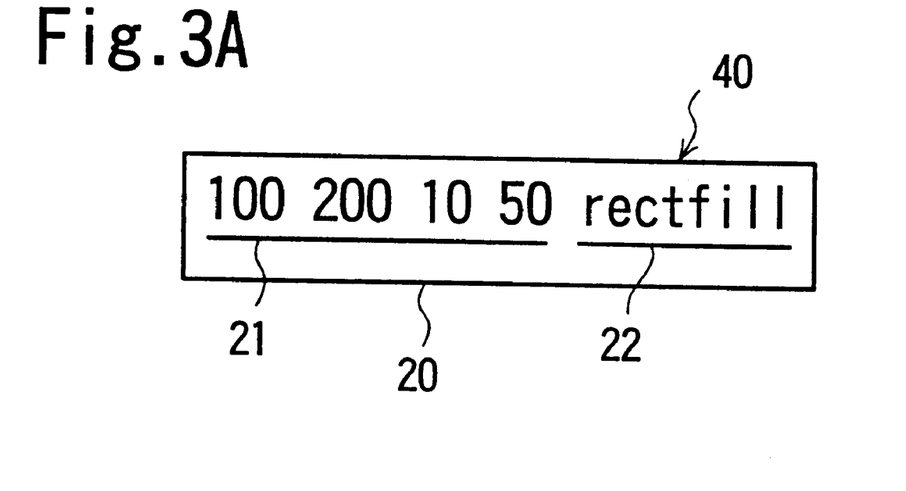
FIG. 3A is an explanatory view illustrating a sample plotting instruction, by way of example, to be interpreted by a first converting procedure.
Figure 3B:
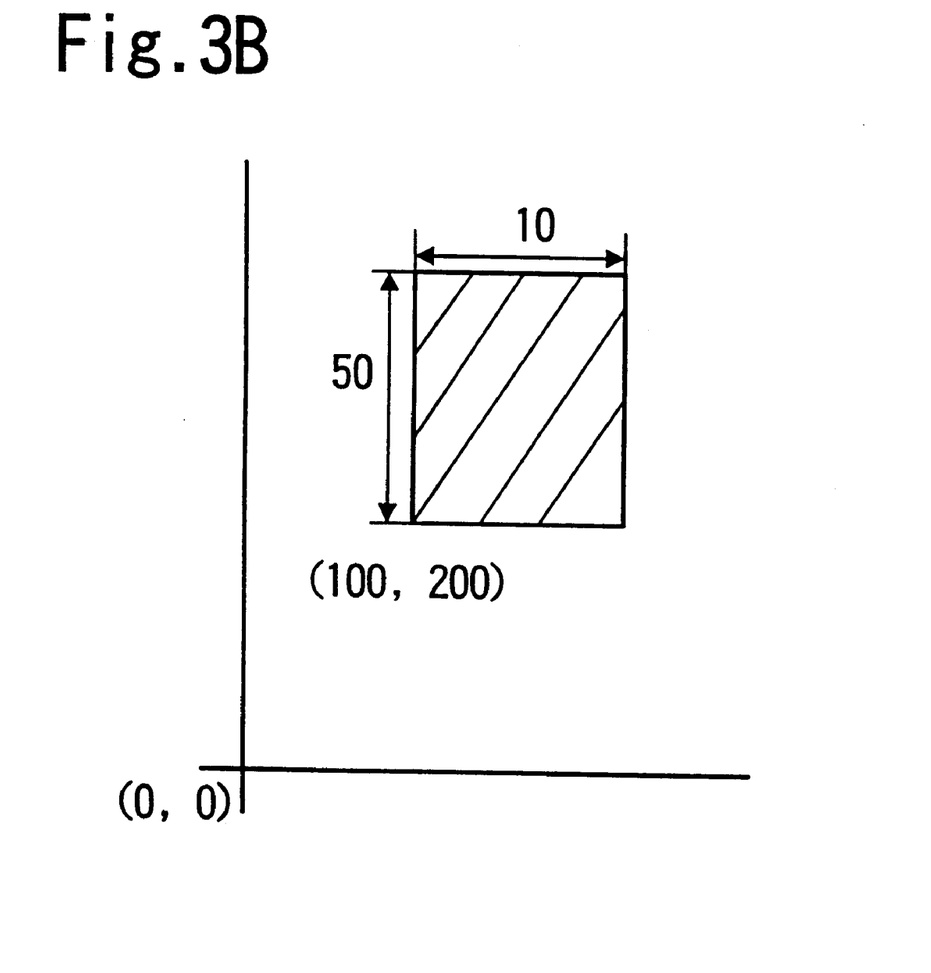
FIG. 3B is a graph showing a drawing produced by interpreting the plotting instruction of FIG. 3A.

First, the first conversion program 16 will be described in detail. FIG. 3A shows sample input data 40, by way of example, including an instruction 20 requesting filling in the entire area of a rectangle shown in FIG. 3B. The instruction 20 has an operand 21 and an operator 22. The numbers in the operand 21 and the operator 22 are separated by spaces. In the example shown in FIG. 3A, the first two numbers [200 100] indicate coordinates on an XY plane, the third number [10] indicates a length along the X-axis from the point designated by the coordinates, the fourth number [50] indicates a length along the Y-axis from the point designated by the coordinates, and the operator 22 [rectfill] indicates filling in a rectangle determined by the length along the X-axis and the length along the Y-axis.

Figure 4:
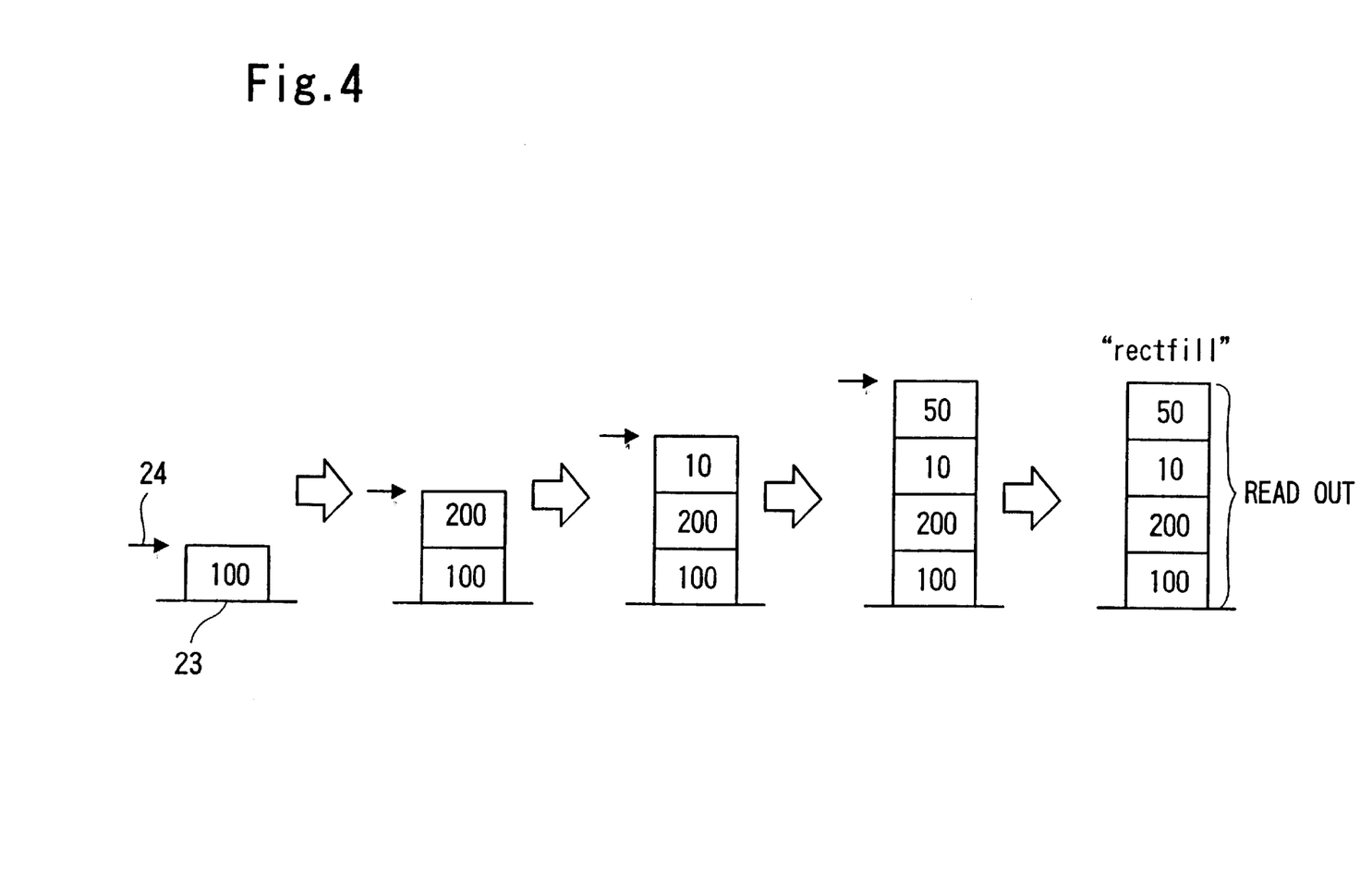
FIG. 4 is a view explaining the state of instruction stacks during input data interpretation.

FIG. 4 shows an instruction stack 23 formed in a predetermined area in the RAM 3 when interpreting the instruction 20 shown in FIG. 3A by the foregoing procedure. The operand 21 and the operator 22 are processed as the data is written to the instruction stack 23 shown in FIG. 4. The data is written to and read from the instruction stack 23 in a first-in, last-out mode and a last data access position is indicated by a stack pointer 24.

Figure 6:
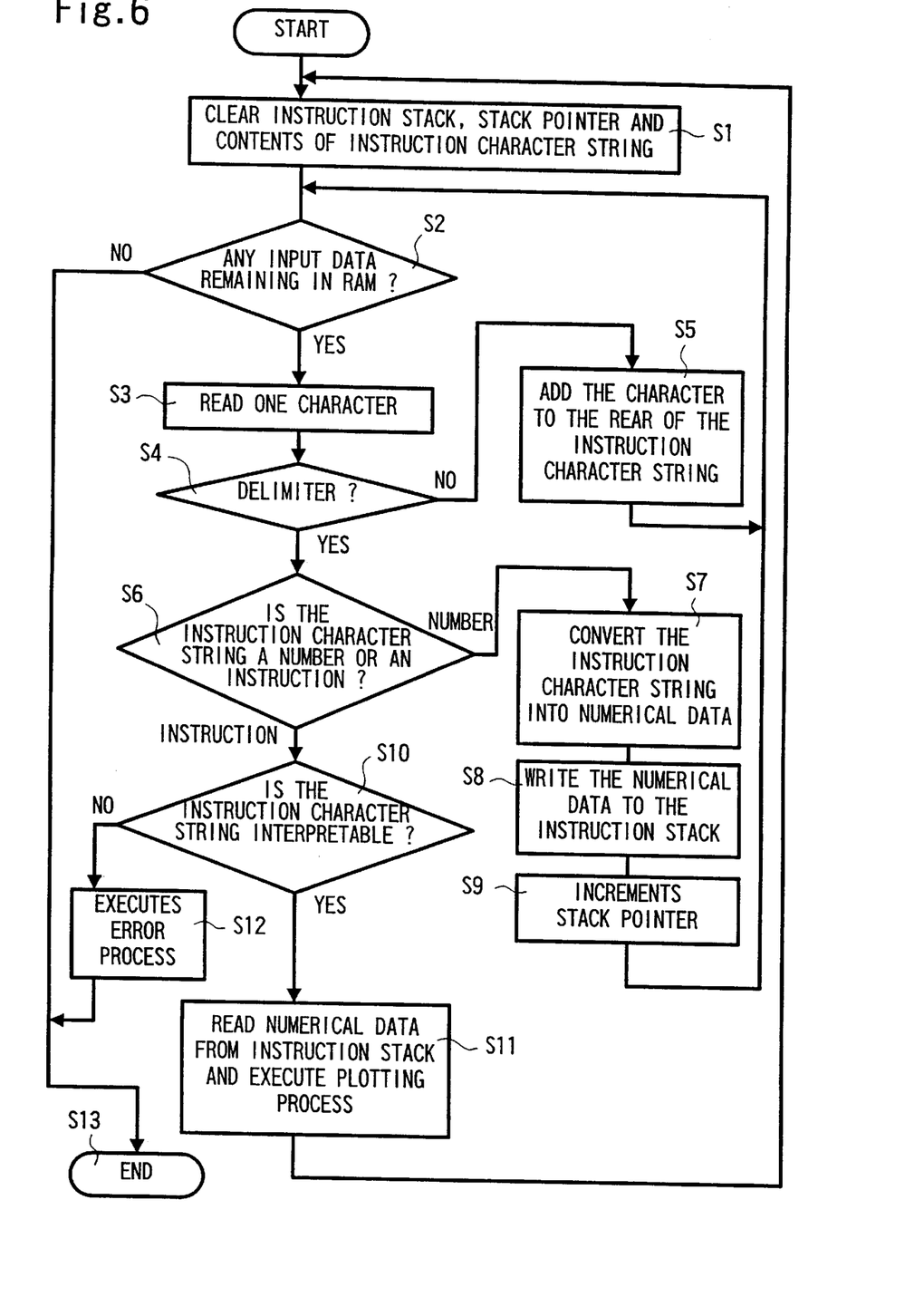
FIG. 6 is a flow chart of a procedure for input data interpretation and plotting.

A procedure for interpreting the input data 40 shown in FIG. 3A through the instruction stack 23 will be described with reference to FIG. 6. This procedure is executed by the CPU 1 according to the first conversion program 16 stored in the ROM 2.

First, the CPU 1 clears the instruction stack 23, the stack pointer 24 and the contents of a instruction character string remaining in the RAM 3 for initialization (S1). Then, the CPU 1 makes a query to see if the input data 40 remains in the RAM 3 (S2) and, if the input data 40 remains in the RAM 3 (the response in S2 is affirmative), the CPU 1 reads one character (S3). In the example shown in FIG. 3A, a numeral [1] is read. When no input data remains in the RAM 3 (the response in S2 is negative), the procedure is ended (S13).

The CPU 1 makes a query to see if the character read in S3 is a symbol indicating the terminal (delimiter, such as a line feed character and a blank character) (S4). When the character is not a delimiter (the response in S4 is negative), the CPU 1 adds the character which was just read to the rear of the instruction character string (S5) and returns to S2 to read the next character. When the character is a delimiter (the response in S4 is affirmative), it is decided that the instruction character string read that time is part of the operand 21 or the operator 22. In the example shown in FIG. 3A, a series of numerals [1], [0] and [0] read in that order is followed by a space (blank character). Therefore, it is decided that the character string [100] read before the space is part of the operand 21 or the operator 22.

Subsequently, the CPU 1 makes a query to see if the instruction character string is a number or an instruction (S6). When the instruction character string is a number (S6, number), the CPU 1 converts the instruction character string into numerical data (S7), writes the numerical data to the instruction stack 23 (S8), increments the stack pointer 24 (S9) and returns to S2 to read the next character. In this example, the character string [100] has been read, the number [100] is written to the instruction stack 23 shown in FIG. 4.

When the instruction character string is an instruction (S6, instruction), the CPU 1 makes a query to see if the instruction character string is interpretable (S10). When the instruction character string is interpretable (the response in S10 is affirmative), the CPU 1 reads the data written to the instruction stack 23, executes a plotting process corresponding to the instruction (S11), and then returns to S1 after completing the plotting process to execute a process specified by the next instruction 20. The input data 40 is converted into the print data 41 by the plotting process. When the instruction character string is not interpretable, (the response in S10 is negative), the CPU 1 executes an appropriate error process (S12) and ends the procedure (S13).

In the example shown in FIG. 3A, the numbers [100] [200], [10] and [50] are written in that order to the instruction stack 23, and then the character string [rectfill] is read. Since this character string is an instruction, the numbers which have previously been written to the instruction stack 23 are read to carry out the plotting process. The plotting process for filling in the rectangular area to obtain the print data will be described with reference to FIGS. 4 and 5.

In the plotting process executed in S11, a rectangular area determined on the basis of the data written to the instruction stack 23 are defined by calculating coordinates designating a start point 31 and an end point 32 of each of lines parallel to the X-axis. For example, in the rectangular area shown in FIG. 3B, the start point 31 and the end point 32 of the first line (shown in FIG. 5) are designated by coordinates (100, 250) and (110, 250), respectively.

Figure 5:
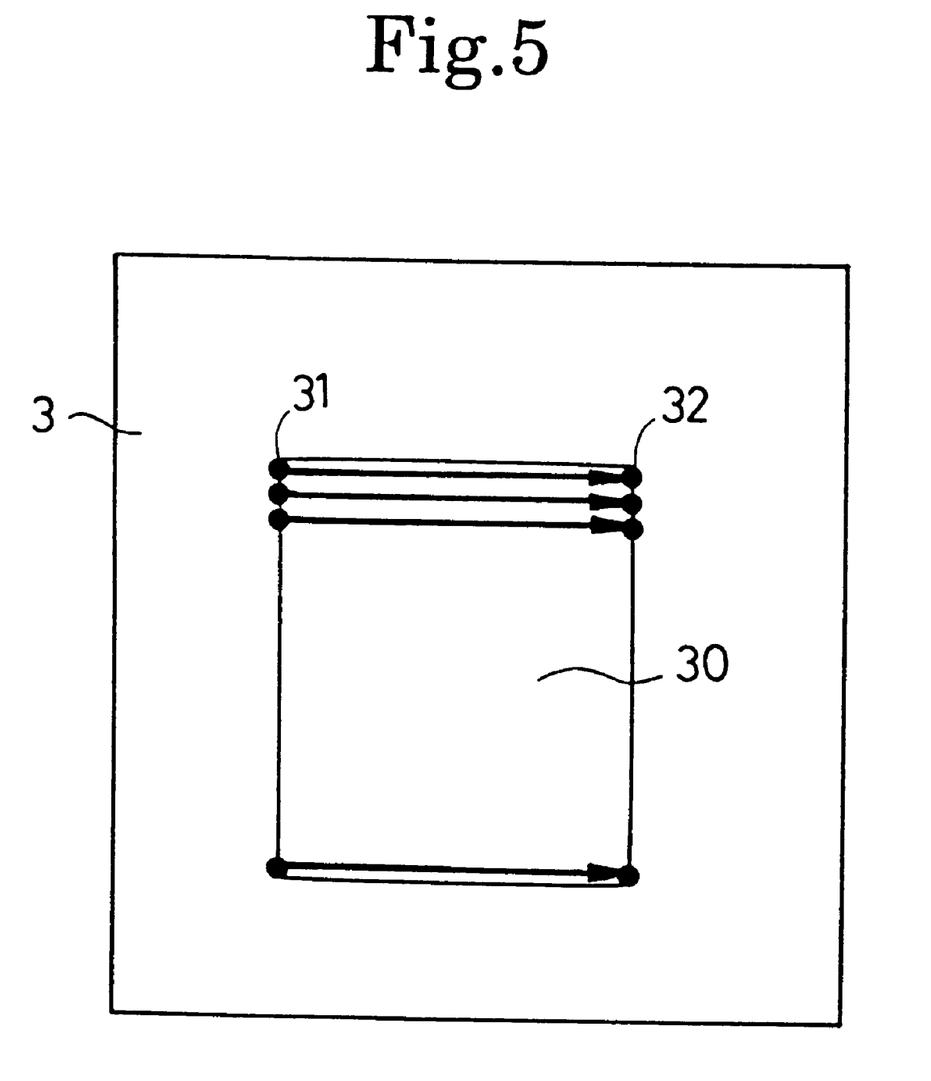
FIG. 5 is a diagrammatic view explaining a process of printing a solid rectangular region.

Then the calculated coordinates are converted into location addresses on the RAM 3. The memory contents between the start point 31 and the end point 32 are replaced with a previously specified bit pattern to accomplish forming one line. Since the rectangle is to be filled in, data indicating printing all the bits between the start point 31 and the end point 32 are written to the RAM 3. The plotting process is repeated for all the lines until the rectangular area 30 is filled in completely. The contents of the RAM 3 is the print data 41 at the completion of the plotting process.

Figure 7:
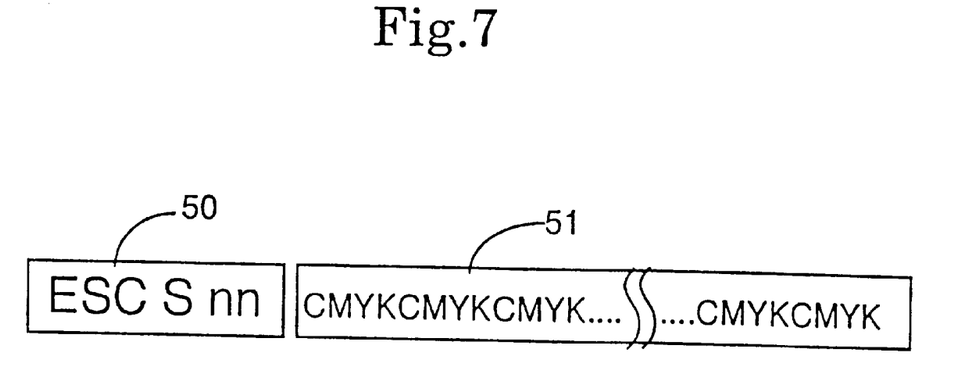
FIG. 7 is a view explaining a format of input data to be interpreted by a second converting procedure.

Next, a data conversion to be carried out by the second conversion program 17 will be described in detail. FIG. 7 shows data on one line converted by the data conversion to be carried out according to the second conversion program 17. A raster data start command 50 indicates that the following data is raster data 51, i.e., pixel data for one line. In the raster data start command 50, 'nn' indicates the number of the raster data 51. Usually, the raster data start command 50 is expressed by hexadecimal notation. In FIG. 7, the raster data start command 50 is expressed in a readable notation. Usually, 'ESC' expressing escape is expressed by '1 Bh' according to the ASCII code system.

Figure 8:
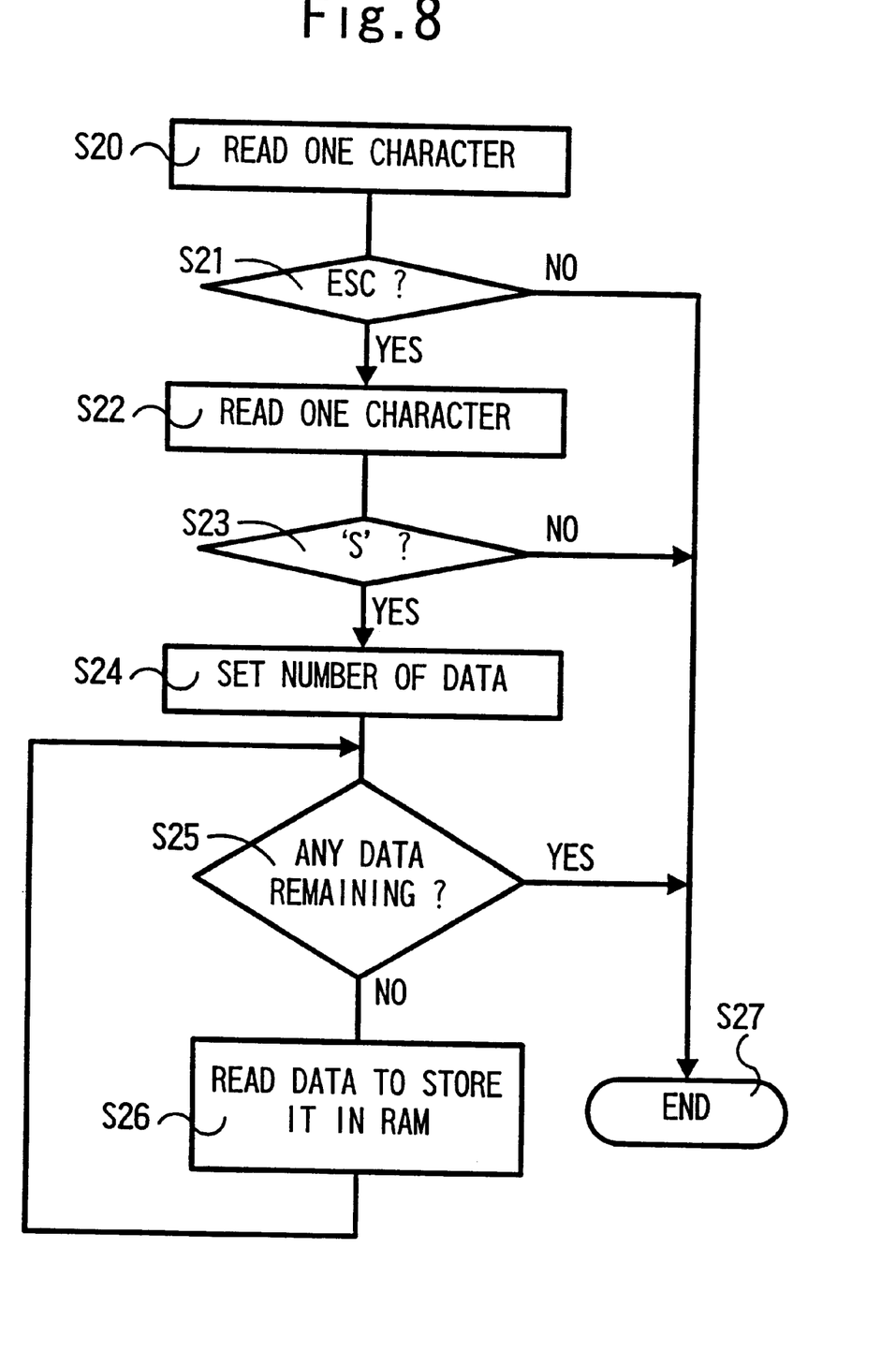
FIG. 8 is a flow chart of the second converting procedure.

A data conversion procedure to be carried out according to the second conversion program 17 will be described in detail with reference to FIG. 8. First, the input interface 6 reads data on the first character of the input data 40 (S20), and the CPU 1 makes a query to see if the read first character of the input data 40 is [1 Bh] expressing 'ESC' (S21). When the first character designates 'ESC' (the response in S21 is affirmative), the input interface 6 reads data on the next character (S22). When the first character does not designate 'ESC' (the response in S21 is negative), it is decided that the input data 40 is not the raster data 51 and the conversion procedure is ended (S27).

Then, the CPU 1 makes a query to see if the raster data subsequent to 'ESC' is 'S' designating the start of raster data (S23). If the data is 'S', (the response in S23 is affirmative), the CPU 1 decides the start of raster data and reads the number of the raster data 51 forming the raster data start command 50 subsequent to 'S' (S24). If not 'S' (the response in S23 is negative), the conversion process is ended (S27).

When the number of data read in S24 is not nil (the response in S25 is affirmative), the raster data 51 is read sequentially and is stored as the print data 41 in the RAM 3 (S26). When the number of remaining data is nil (the response in S25 is negative), the data conversion process for one line is ended (S27).

Figure 9:
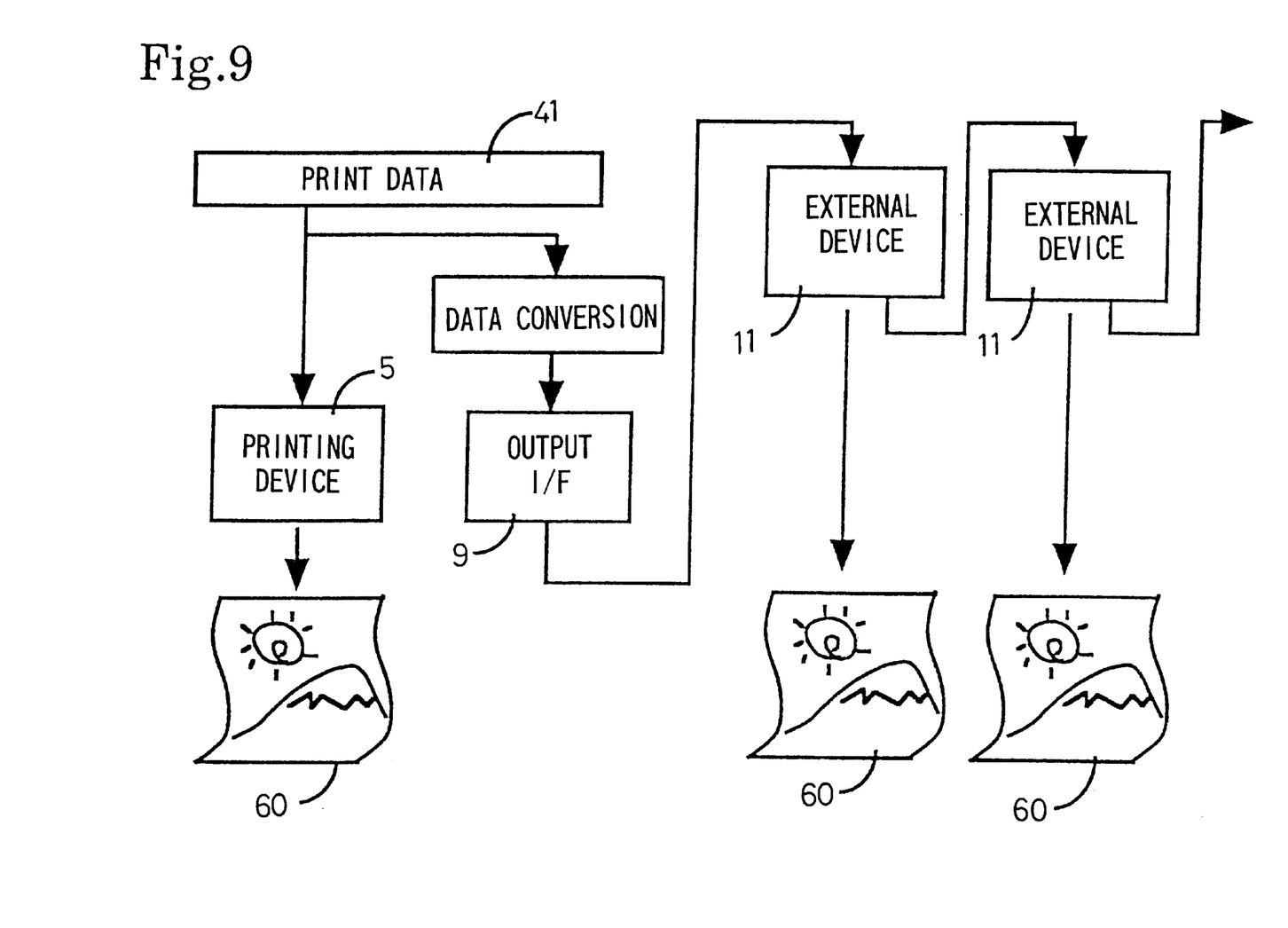
FIG. 9 is a block diagram explaining a parallel printing operation for producing copies.
Figure 10:
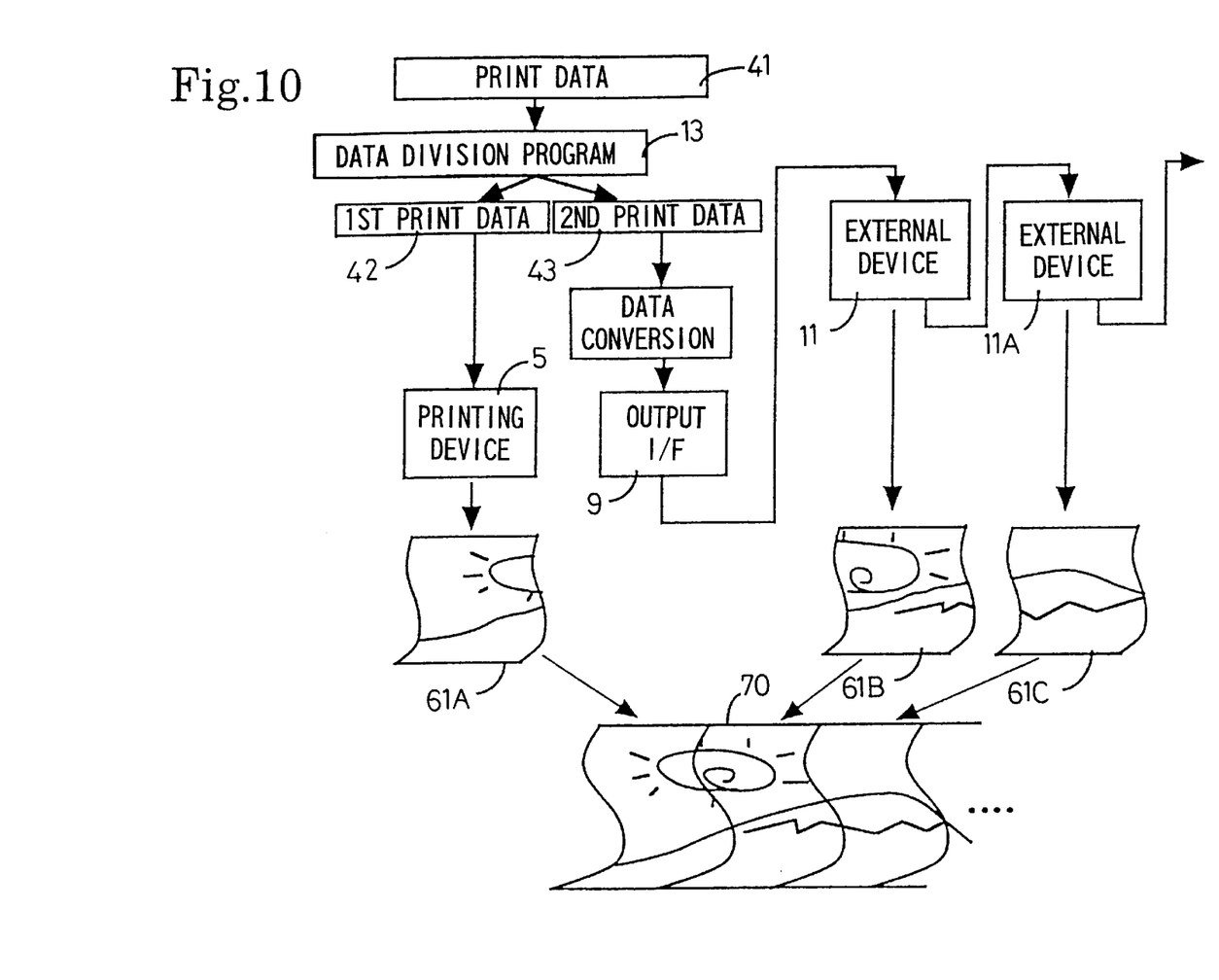
FIG. 10 is a block diagram explaining a parallel printing operation for printing divided print data.

A copy printing mode and a division printing mode will be described with reference to FIGS. 9 and 10. A plurality of printers of the same function in accordance with the present invention can be connected for parallel printing, in which all the printers operate simultaneously. The parallel printing in the copy printing mode and the division printing mode will be described.

First, the copy printing mode will be described with reference to FIG. 9. In operation in the copy printing mode, the print data 41 is given to both the print device 5 and the output interface 9. When the print data 41 is given to the output interface 9, the data format of the print data 41 is converted into a data format that can be interpreted by the external apparatuses 11 connected to the output interface 9.

When the external apparatuses 11 are printers, such as a printer having the print device 5, the print data 41 is transferred to the output interface 9 without being converted. Therefore, the same print data 41 is fed to the print device 5 and the printers, i.e., the external apparatuses 11. Consequently, a plurality of printed sheets 60 can be produced in a time usually required for producing a single printed sheet 60. When the external apparatuses 11 are printers in accordance with the present invention, the plurality of printers are connected to produce a number of copies corresponding to the number of connected printers in a time necessary for producing a single printed sheet.

The division printing mode will be described with reference to FIG. 10. In the division printing mode, the print data 41 is divided into first print data 42 and second print data 43 by a procedure expressed by the data division program 13, which will be described later. The first print data 42 is fed to the print device 5, and the second print data 43 is transferred to the output interface 9. The second print data 43 is converted into that of a data format interpretable by the external apparatuses 11 before being transferred to the output interface 9.

When the external apparatuses 11 are the same printers as those having the print device 5, the second print data 43 is transferred to the output interface 9 without being converted. Thus, the external apparatuses 11 and the printer having the print device 5 operate simultaneously to produce printed sheets 61A, 61B and 61C simultaneously in a time required for producing a single printed sheet. The printed sheets 61A, 61B and 61C are put together to obtain one large printed sheet 70 of a sheet size greater than that which each printer is able to print. When the external apparatuses 11 are printers in accordance with the present invention, a plurality of printers can be connected and a number of printed sheets equal to the number of connected printers can be produced in a time required for producing a single printed sheet. The maximum size of the large printed sheet 70 is equal to the sum of print sizes in which the connected printers are able to print, respectively.

The data division program 13 for dividing the print data 41 into the first print data 42 and the second print data 43 will be described in detail with reference to FIGS. 10, 11 and 12.

Figure 11:
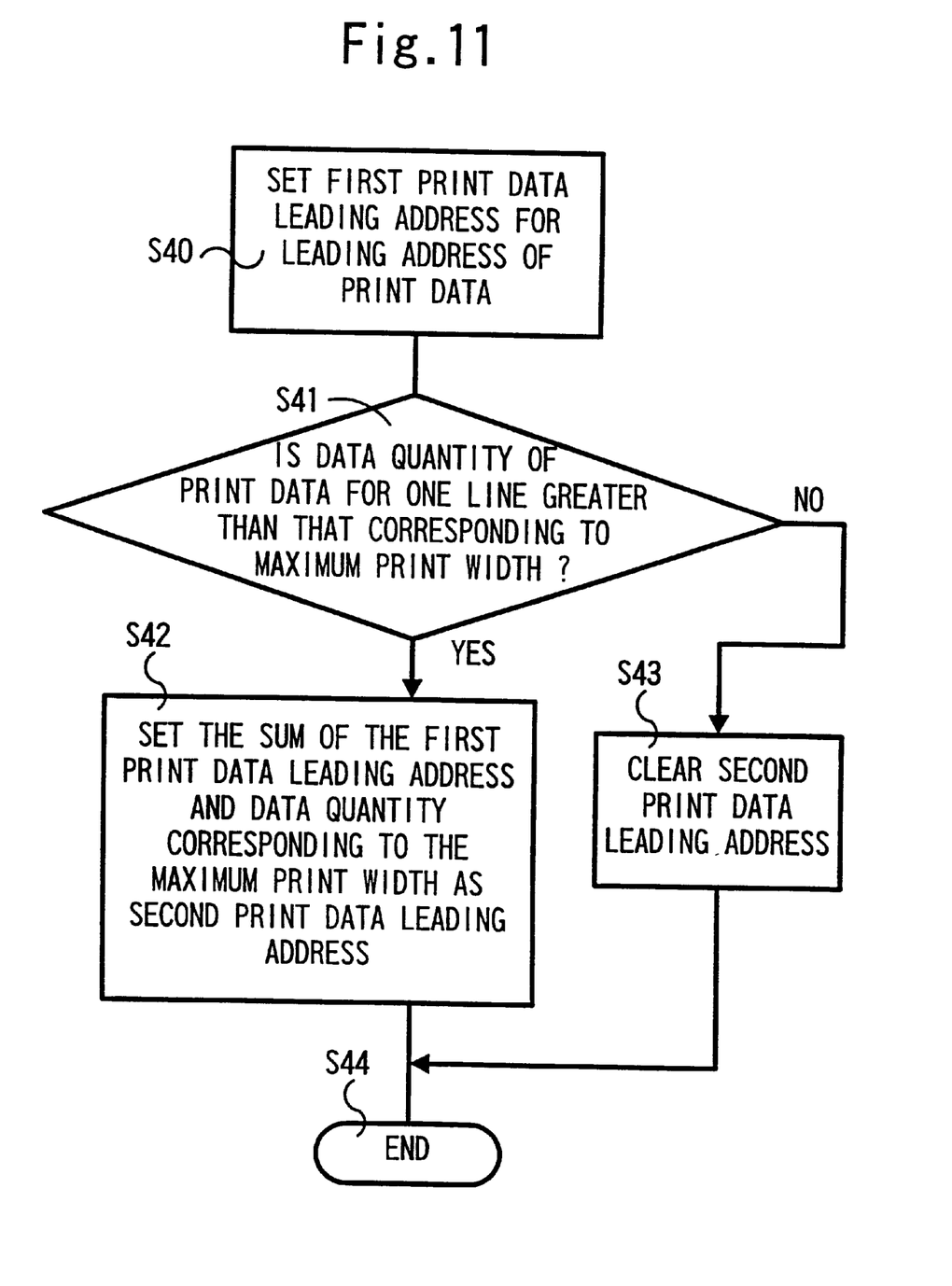
FIG. 11 is a flow chart of a data dividing procedure.
Figure 12:
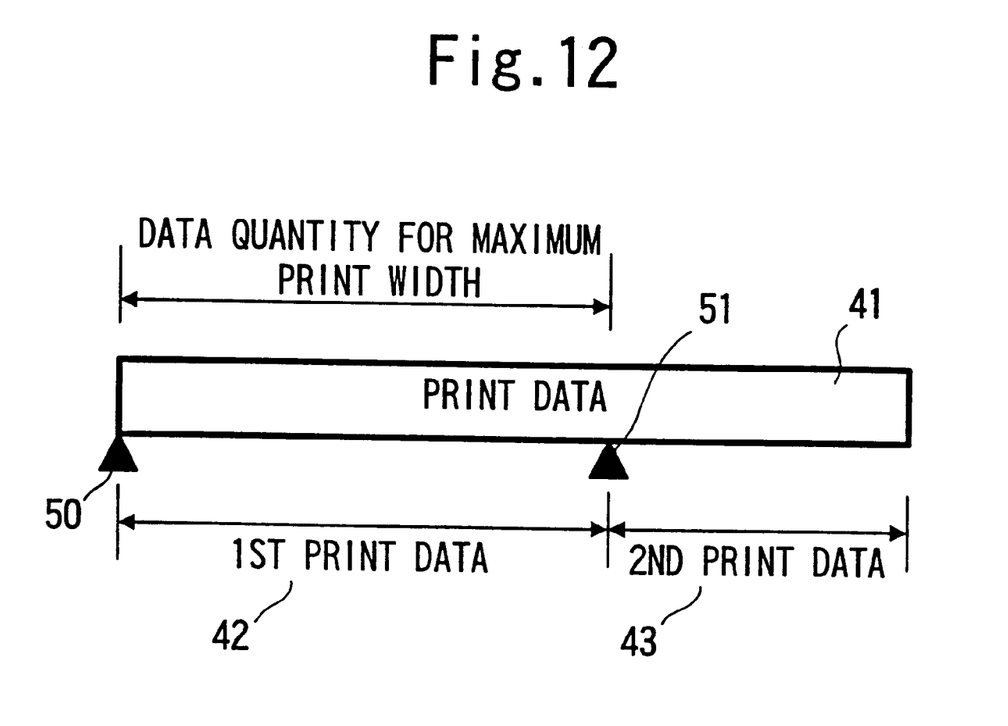
FIG. 12 is a view of divided print data.

Referring to FIGS. 11 and 12, the print data 41 for one line is stored in continuous locations on the RAM 3. First, the CPU 1 sets a first print data leading address 50 indicating the leading address of a data portion corresponding to the first print data 42 for the leading address of the print data 41 stored in the RAM 3 (S40). Then, the CPU 1 makes a query to see if the data quantity of the print data 41 is greater than a maximum data quantity, i.e., data quantity corresponding to a maximum print width in which the print device 5 is able to print (S41). If the response in S41 is affirmative, the CPU 1 sets the sum of the first print data leading address 50 and a data-quantity corresponding to the maximum print width as a second print data leading address 51 indicating a data portion corresponding to the second print data 43 (S42) and ends the data division procedure (S44). When the data quantity of the print data 41 is not greater than the data quantity corresponding to the maximum print width (the response in S41 is negative), the print data need not be divided. Therefore, the CPU 1 clears the second print data leading address 51 (S43) and ends the data division procedure (S44).

Upon completion of the data division procedure according to the data division program 13, the first print data 42 stored in the RAM 3 at locations starting from the leading address 50 is fed to the print device 5, and the second print data 43 stored in the RAM 3 at locations starting from the leading address 51 is converted into that of a data format interpretable by the external apparatus 11 and then transferred to the output interface 9. When the external apparatuses 11 are printers, the data format of the second print data 43, in some cases, need not be changed.

The first print data 42 obtained by dividing the print data 41 by the data division procedure according to the data division program 13 carried out by the printer in this embodiment is printed by the print device 5 to produce a printed sheet 61A. The second print data 43 is given through the output interface 9, if necessary, after converting the data format thereof to the external apparatus 11. The external apparatus 11 executes printing operations on the basis of the second print data 43.

When the external apparatus 11 is the same printer as the printer in this embodiment and the data quantity of the second print data 43 is greater than that of print data that can be handled by the external apparatus 11, the second print data 43 is further divided into small data quantities, and the divided print data is given to a second external apparatus 11A from the external apparatus 11. Thus, the print data 41 is divided into three divisions of print data as shown in FIG. 10. The three divisions of print data are printed simultaneously to produce printed sheets 61A, 61B and 61C simultaneously, and the printed sheets 61A, 61B and 61C are put together to obtain a large printed sheet 70.

Although the printer in a preferred embodiment according to the present invention has been described, the present invention is not limited in its practical application to the printer specifically described above.

Figure 13:
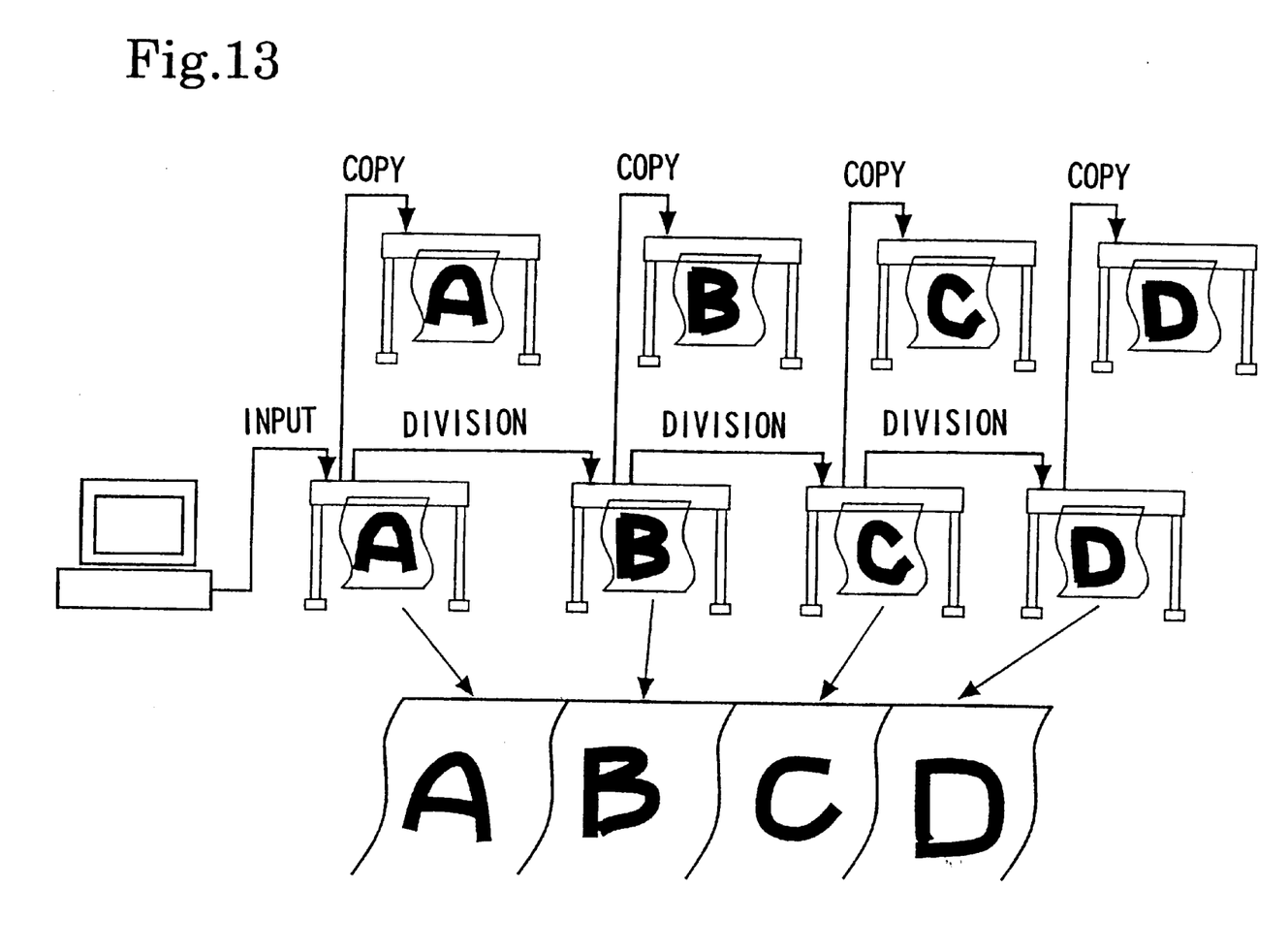
FIG. 13 is a printing system constructed by connecting a plurality of printers in accordance with the present invention.

For instance, the output interface may be a generally known parallel interface available from Centronics Co., a SCSI, i.e., a fast interface, or the like. The printer is not necessarily provided with one data transmitting device. The printer may be provided with two data transmitting devices and a print mode selecting device for selecting the copy printing mode or the division printing mode and may be capable of printing the divided print data for copy printing as shown in FIG. 13 for further efficient printing. When the printer is provided with three or more data transmitting devices, the printer is applicable to various purposes.

Furthermore, the printer in this embodiment may be a laser printer or an ink-jet printer, and there is no limitation to printing range. Printers differing from each other in printing range may be connected for parallel printing. Although the present invention has been described as applied to parallel printing in the copy printing mode and the division printing mode, naturally, the printer is capable of printing in the copy printing mode and the division printing mode by itself according to a conventional printing method. It is to be understood that various changes and variations may be made in the preferred embodiment specifically described herein without departing from the scope of the invention.

What is claimed is:

1. A printing assembly comprising:

an input that inputs data;

a memory coupled to the input that stores the input data;

a controller coupled to the memory that reads the input data stored in the memory as print data;

a printing device coupled to the controller that reads the print data and executes printing based on the print data;

an output that transfers print data from the controller to at least one external data processing apparatus; and a mode selector coupled to the controller that selects between a copy printing mode and a division printing mode, wherein the controller divides the print data into at least two groups of data, wherein one group of data is read by the printing device and the remaining at least one group of data is transferred by the output to at least one external data processing apparatus.

2. The printing assembly of claim 1, wherein the controller divides the print data by determining a print width of the print data compared to a maximum print width of the printing device.

3. The printing assembly of claim 1, wherein the controller divides the print data so that one portion of the print data is read by the printing device and another portion of the print data is transferred to at least one external data processing apparatus by the output so that different portions of a single print job are printed contemporaneously.

4. The printing assembly of claim 1, wherein the output transfers the same print data to at least one external data processing apparatus as the print data that is read by the printing device in order to execute more than one print job based on the same print data contemporaneously.

5. The printing assembly of claim 1, wherein the controller converts input data into print data by reading character strings of input data, writing corresponding instructions, and plotting bit pattern print data based on the instructions.

6. The printing assembly of claim 1, further comprising in combination at least one external data processing apparatus coupled to the output.

7. The printing assembly of claim 6, wherein the at least one external data processing apparatus is a printing device.

8. The printing assembly of claim 1, wherein the controller converts the print data, which is transferred by the output, to print data that is compatible with the at least one external data processing apparatus.

9. The printing assembly of claim 1, wherein the output is an output interface that is connectable to a plurality of external data processing apparatuses.

10. The printing assembly of claim 1, wherein when the mode selector selects the copy printing mode, the print data is printed by the printing device and is also transferred to and printed by the external data processing apparatus.

11. The printing assembly of claim 1, wherein when the mode selector selects the division printing mode, one group of print data is printed by the printing device and the remaining at least one group of print data is transferred to the external data processing apparatus for printing or further division based on a quantity of the remaining at least one group of print data.

12. A printer assembly comprising:

data receiving means for receiving input data from an external apparatus;

printing means for carrying out printing operations based on the input data;

data transmitting means for transmitting the input data to an external data processing assembly; and printing mode selector means for selecting between a copy printing mode, in which the printing means carries out a printing operation based on the same data that is transmitted by the data transmitting means for contemporaneous printing of similar portions of one print job, and a division printing mode, in which the printing means carries out a printing operation based on different data than the data that is transmitted by the data transmitting means for contemporaneous printing of different portions of one print job.

13. The printer assembly of claim 12, further comprising:

data quantity comparing means for comparing a total data quantity of the input data with a predetermined data quantity; and data dividing means for dividing the input data into first print data having a data quantity corresponding to the predetermined data quantity and second print data corresponding to a remaining portion of the input data when the total data quantity of the input data is greater than the predetermined data quantity, wherein the printing means carries out a printing operation based on the first print data, and the data transmitting means transmits the second print data to the external data processing assembly.

14. The printer assembly of claim 13, further comprising data converting means for converting the received input data into print data, and wherein the data converting means is first data converting means and wherein the assembly further comprises second data converting means for converting the second print data into a data format that is interpretable by the external data processing assembly.

15. A printing method comprising steps of:

receiving input data from an external apparatus;

reading the input data as print data;

carrying out a printing operation based on the print data;

transmitting the print data to another printer; and selecting between a copy print mode in which the same print data is printed in the printing operation that is transmitted to another printer and a division printing mode in which different portions of the print data are printed in the printing operation and are transmitted to another printer respectively.

16. The printing method of claim 15 further comprising the steps of:

comparing a total data quantity of the print data with a predetermined data quantity; and dividing the print data into first print data corresponding to the predetermined data quantity and second print data corresponding to a portion of the data remaining other than the first print data when the total data quantity of the print data is greater than the predetermined data quantity, wherein the step of carrying out a printing operation is based on the first print data, and wherein the step of transmitting the print data to another printer transmits the second print data.

17. The printing method of claim 16, further comprising the step of converting the second print data into a data format interpretable by the other printer before the second print data is transmitted to the other printer.

* * * * *